United States Patent [19]

Matsuyama

[11] 4,368,417

[45] Jan. 11, 1983

[54] OUTPUT VOLTAGE-ADJUSTING DEVICE FOR VEHICLE-MOUNTED GENERATORS

[75] Inventor: Youji Matsuyama, Higashiyamato, Japan

[73] Assignee: Honda Giken Kogyo Kabushiki Kaisha, Tokyo, Japan

[21] Appl. No.: 221,192

[22] Filed: Dec. 29, 1980

[30] Foreign Application Priority Data

Dec. 29, 1979 [JP] Japan ............................ 54-182818[U]

[51] Int. Cl.³ .............................................. H02J 7/14
[52] U.S. Cl. ........................................ 322/29; 320/64
[58] Field of Search ................. 322/17, 29, 32, 89–95, 322/28; 320/61, 62, 64, 68

[56] References Cited

U.S. PATENT DOCUMENTS 2,840,775  6/1958  Steadman ............................ 322/28
4,015,187  3/1977  Sasaki et al. ..................... 322/29 X
4,169,992  10/1979  Nash ................................. 322/29

Primary Examiner—R. J. Hickey
Attorney, Agent, or Firm—Posnack, Roberts, Cohen & Spiecens

[57] ABSTRACT

An output voltage-adjusting device for a vehicle-mounted generator comprising a circuit including a generator drivably connected to an engine and whose electromagnetic coil is connected to a battery via a switching device adapted to open the circuit upon receipt of an input signal. A signal device is operably coupled to the engine for generating electrical signals of a frequency corresponding to the rotational speed of the engine, and an oscillator converts the output signals of the signal device into pulse signals of a predetermined width having a frequency proportional to the rotational speed of the engine and sends the pulse signals as input signals to the switching device.

6 Claims, 3 Drawing Figures

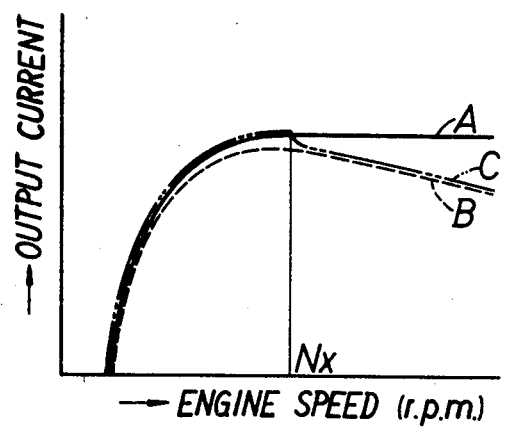

OUTPUT VOLTAGE-ADJUSTING DEVICE FOR VEHICLE-MOUNTED GENERATORS

FIELD OF THE INVENTION

The present invention relates to an output voltage-adjusting device for separately-excited generators that are driven by an engine mounted on vehicles such as automobiles and motorcycles.

PRIOR ART

In general, when the exciting current of an exciting coil is set constant, the output current of a separately-excited generator increases with the increase in the running speed of the engine until the running speed of the engine reaches a predetermined value as indicated by a curve A of FIG. 3, and then remains constant. According to the conventional output voltage-adjusting devices used for the separately-excited generators, an electric current is permitted to flow into the exciting coil when the battery voltage is smaller than a preset value and is interrupted when the battery voltage is greater than the preset value. Therefore, in the event that the amount of electricity stored in the battery is as small as less than one-half of its rated capacity while the engine is running at high speeds, the generator produces electricity at it maximum capability. Therefore, the temperature of the generator rises excessively due to self-heating to deteriorate the endurance of each part thereof.

SUMMARY OF THE INVENTION

The present invention was contrived in view of the above-mentioned circumstances. Namely, the object of the invention is to provide an output voltage-adjusting device which so controls the generator that its output decreases with the increase in the running speed of the engine at high-speed ranges, thereby to suitably restrain the electric charging in order to prevent an excess rise of temperature caused by the self-heating of the generator even when the battery needs large charging currents.

The above and other objects, as well as advantageous features of the invention will become clear from the following description of preferred embodiments taken in conjunction with the accompanying drawings.

BRIEF DESCRIPTION OF THE DRAWINGS

FIG. 3 is a diagram illustrating the output current characteristics of a generator relative to the running speed of the engine, in which a curve A represents the conventional characteristics, a curve B represents characteristics according to the first embodiment of the present invention, and a curve C represents characteristics according to the second embodiment of the present invention.

DESCRIPTION OF THE PREFERRED EMBODIMENTS

Figure 1:
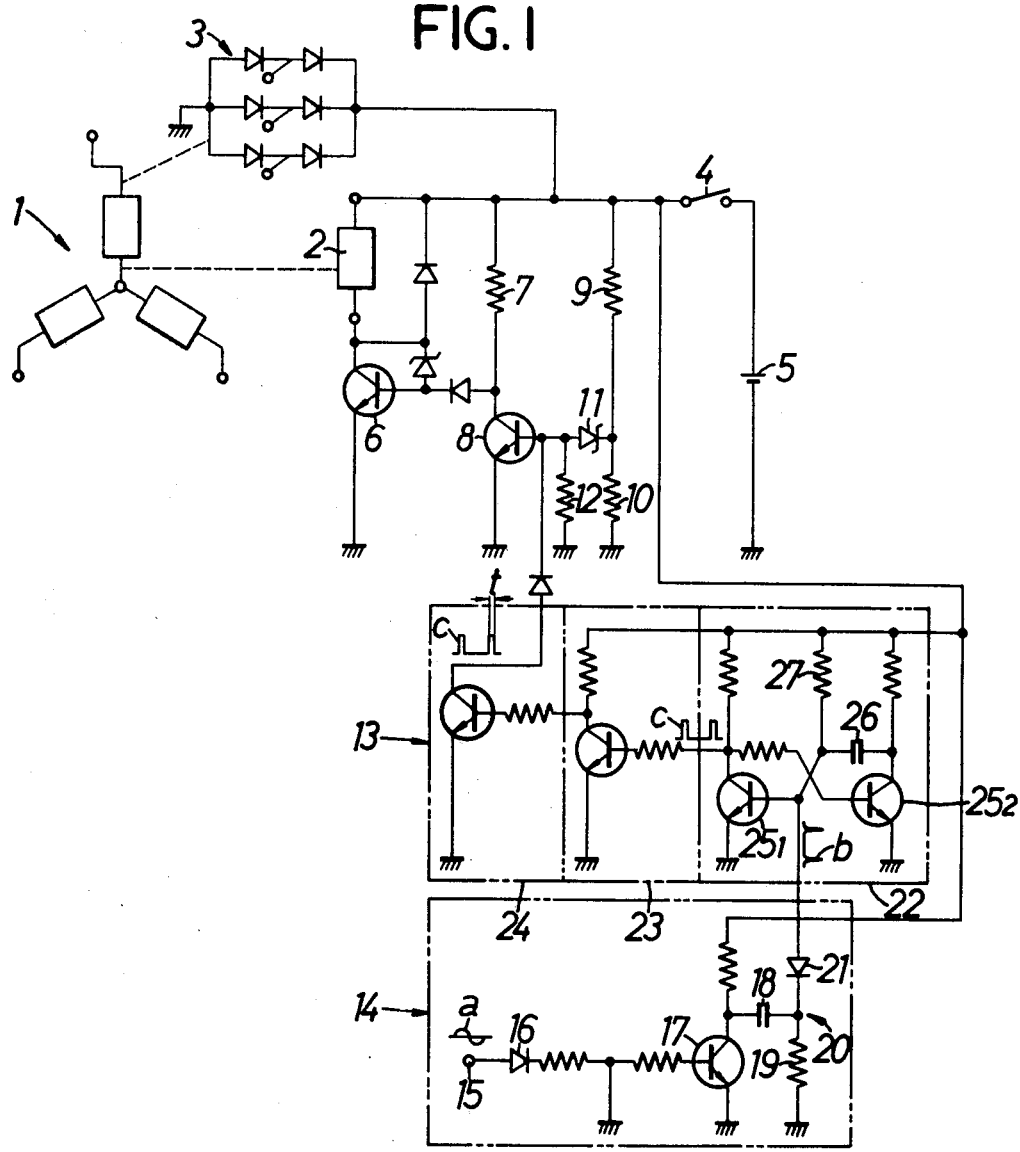
FIG. 1 is a diagram of an electric circuit according to a first embodiment of the present invention.

FIG. 1 illustrates a first embodiment of the invention, in which a separately-excited generator consists of a stator coil, an exciting coil 2, a rotor driven by the engine, and a rectifier 3. The exciting coil 2 and the rectifier 3 are connected to a battery 5 via a main switch 4.

A first NPN-type switching transistor 6 is connected to the grounding side of the exciting coil 2, a resistor 7 is connected to the base of the transistor 6 to apply a biasing voltage thereto, and the resistor 7 is grounded via a second NPN-type switching transistor 8.

by Further, voltage-dividing registers 9, 10 for producing a biasing voltage are connected to the base of the second switching transistor 8, and a Zener diode 11 is inserted between the base of the second switching transistor 8 and the voltage-dividing dividing registors. Reference numeral 12 denotes a registor for adjusting the biasing voltage.

An oscillator 13 and a signal generator 14 are connected to the base of the second switching transistor 8.

The signal generator 14 has a pickup 15 for delivering signals from the generator or from another signal generator which is coupled to the crank shaft of the engine. The pickup 15 produces signals a of a sinusoidal waveform having a frequency proportional to the running speed of the engine. The signals a are rectified through a diode 16, shaped into rectangular waves through a transistor 17, and are converted into differentiated waveforms through a differentiation circuit 20 consisting of a capacitor 18 and a registor 19. Finally, among the signals of the differentiated waveforms, signals b of a negative waveform are delivered by a diode 21 and are produced as output signals of the signal generator 14.

The oscillator 13 consists of a monostable multivibrator 22 which receives the signals b as input signal, a first signal inverter circuit 23 for inverting and stabilizing the output signals of the multivibrator 22, and a second signal inverter circuit 24 for again inverting the output signals of the circuit 23. Under ordinary conditions in which there is no input signal, a first transistor $25_1$ in the monostable multivibrator 22 remains conductive and a second transistor $25_2$ remains nonconductive. Upon receipt of the output signal b of the signal generator 14 through the base, the first transistor $25_1$ is rendered nonconductive and the second transistor $25_2$ is rendered conductive. The transistors $25_1$ and $25_2$ then return to their initial states after a predetermined time t (for example, 1.5 msec.) as determined by the time constant of capacitor 26 and registor 27 has passed.

Consequently, the first transistor $25_1$ produces a pulse signal c of a predetermined width t through the collector upon receipt of each signal b. The output signal is inverted by the first signal inverter circuit 23 and is inverted again by the second signal inverter circuit 24. Finally, the signal c is produced as an output signal of the oscillator 13 and fed to the base of the second switching transistor 8.

In the thus constructed device, when the main switch 4 is closed, a biasing voltage is applied to the base of the first switching transistor 6 via the resistor 7. The transistor 6 is rendered conductive, and the exciting coil 2 is served with a current and is excited. When the rotor having the exciting coil 2 is rotated by the engine, an ac current is generated in the stator coil 1, rectified into a dc current by a rectifier 3, and is supplied to the battery 5. As the battery 5 is electrically charged, the battery voltage gradually increases. When the voltage divided by the resistors 9, 10 becomes greater than a voltage that is set by the Zener diode 11, the biasing voltage is applied to the base of the second switching transistor 8 through the Zener diode 11 and the transistor 8 is rendered conductive. Therefore, the base potential of the first switching transistor 6 is decreased. Namely, the transistor 6 is rendered nonconductive to interrupt the current which flows into the exciting coil 2. Accordingly, the stator coil 1 ceases to generate electricity. Therefore, the generator generates the electricity when the battery voltage is smaller than the voltage set by registors 9, 10 and by Zener diode 11, and ceases to generate the electricity when the battery voltage is greater than the setpoint value.

When the engine is running, pulse signals b are produced by the signal generator 14 in a number corresponding to the running speed of the engine and are fed to the oscillator 13 which produces rectangular-wave pulses c responsive to the pulse signals b. The rectangular-wave pulses c are fed to the base of the second switching transistor 8. Therefore, the transistor 8 is rendered conductive upon receipt of each pulse c, and causes the first switching transistor 6 to be rendered nonconductive, such that the current flowing into the exciting coil is interrupted.

The frequency of the rectangular-wave pulses c generated by the oscillator 13, i.e., the number of pulses produced within a unit time, is proportional to the running speed of the engine. Therefore, the durations in which the second switching transistor 8 remains conductive within the unit period of time, i.e., the durations in which the first switching transistor 6 remains nonconductive, are lengthened with the increases in the running speed of the engine, and the exciting current flowing into the exciting coil 2 is reduced. This tendency becomes conspicuous particularly when the engine is running at high speeds. Accordingly, the output current of the generator decreases with the increase in the running speed of the engine after a maximum value has been reached as indicated by a curve B in FIG. 3.

According to the present invention as mentioned above, the output current of the generator can be reduced with the rise in the running speed of the engine in the high-speed regions owing to the effect of interrupting the exciting current based upon the output pulses of the oscillator. Consequently, the battery is prevented from being heavily charged when the engine is running at high speeds. In other words, the self-heating of the generator is restrained, and the generator is prevented from becoming excessively hot.

Figure 2:
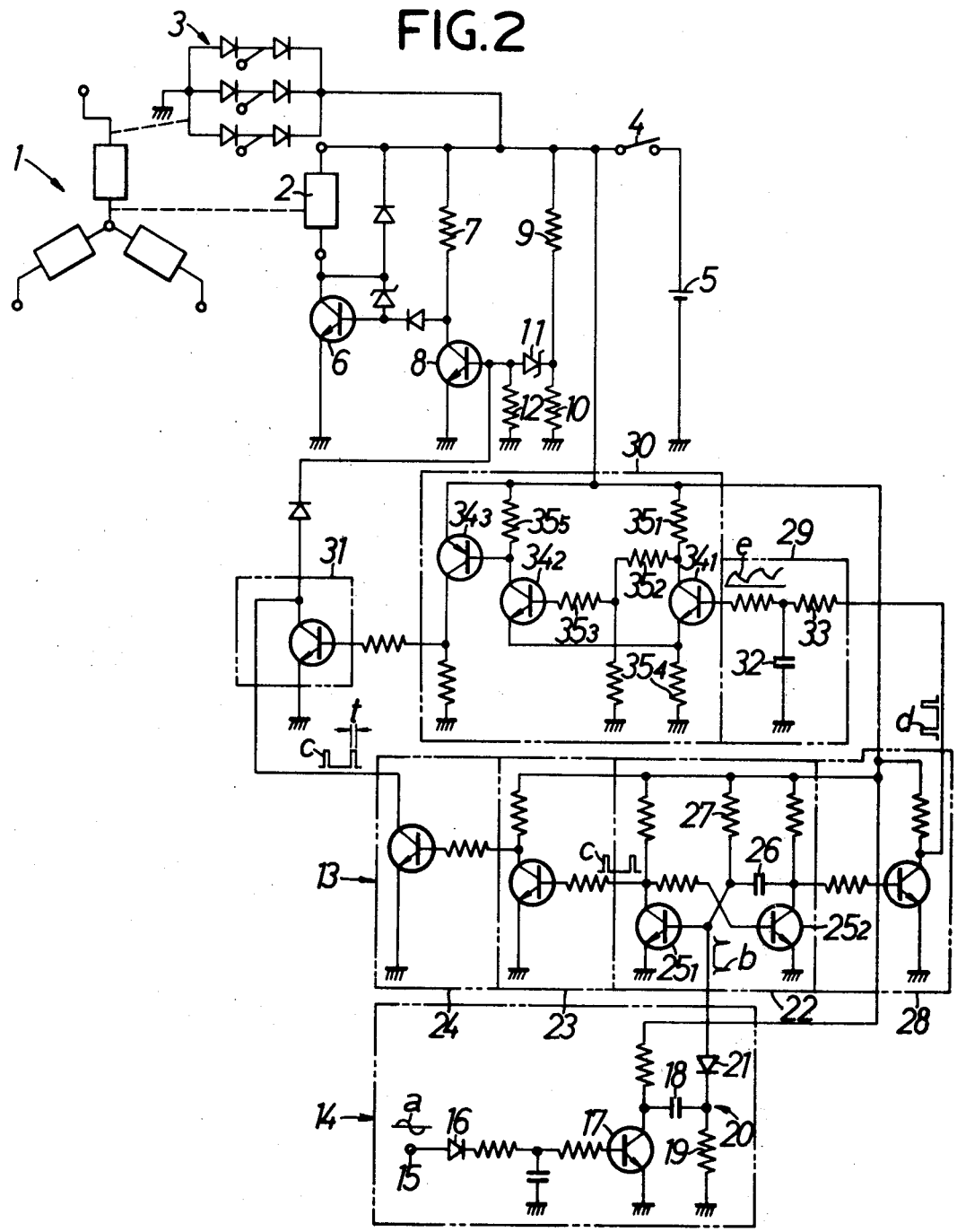
FIG. 2 is a diagram of an electric circuit according to a second embodiment of the present invention.

FIG. 2 illustrates a second embodiment according to the present invention, which is made up of the above-mentioned first embodiment and the setup that will be mentioned below. Namely, an F-V converter 29 is connected to the collector of the second transistor $25_2$ of the monostable multivibrator 22 via a third signal inverter circuit 28, a comparator 30 consisting of a Schmidt circuit is connected to the F-V converter 29, and a gate circuit 31 connected to the comparator 30. The gate circuit 31 is provided in a signal circuit which connects the oscillator 13 to the second switching transistor 8.

Here, the conductive state and the non-conductive state of the first and second transistors $25_1$, $25_2$ in the monostable multivibrator 22 always establish an inverse relation. Hence, the output signal produced from the collector of the second transistor $25_2$ corresponds to the one that is obtained by inverting the output signal from the collector of the first transistor $25_1$. The output signal of the second transistor $25_2$ is inverted by the third signal inverter circuit 28. Consequently, output signals d having the same waveform and frequency as the output signals c of the second transistor $25_1$ are generated from the third signal, inverter circuit 28. The signals d serve as second output signals of the oscillator 13 and are sent as input signals to the F-V converter 29 of the next stage.

The F-V converter 29 consists of a capacitor 32 and a resistor 33, which work to convert the input signals d into voltage waveforms e corresponding to the frequency of the signals d. Since the second output signals d of the oscillator 13 have a frequency which is proportional to the running speed of the engine, the output voltage of the F-V converter 30 becomes proportional to the running speed of the engine.

The output signals e of the F-V converter 29 is applied to the comparator 30 in which a first transistor $34_1$ is rendered nonconductive when the input signals e has a small voltage. Therefore, a second transistor $34_2$ is served with a current via resistors $35_1$, $35_2$, $35_3$ and is rendered conductive, whereby a third transistor $34_3$ is served with a base current and is rendered conductive. In this case, the emitter of the first transistor $34_1$ is served with a constant voltage determined by resistors $35_4$ and $35_5$. Hence, the first transistor $34_1$ is maintained nonconductive unless the voltage of the input signals e becomes greater than the emitter voltage of the first transistor $34_1$. Consequently, the second and third transistors $34_2$ and $34_3$ are maintained conductive, and the transistor in the gate circuit 31 is rendered conductive by the output from the collector of the third transistor $34_3$. The first output signals c of the oscillator 13 are short-circuited in the gate circuit 31 and are not sent to the second switching transistor 8.

If now the running speed of the engine rises above the setpoint value, and the voltage of the output signals e of the F-V converter 29 becomes greater than the emitter voltage of the first transistor $34_1$ of the comparator 30, the transistor $34_1$ is rendered conductive, the second and third transistors $34_2$ and $34_3$ are rendered nonconductive, and the transistor in the gate circuit 31 is rendered nonconductive. Accordingly, the first output signals c of the oscillator circuit 13 are not short-circuited in the gate circuit 31, but are applied to the base of the second switching transistor 8. From this moment, the exciting current flowing into the exciting coil 2 is reduced with the increase in the running speed of the engine owing to the same operation as in the aforementioned first embodiment. As indicated by a curve C in FIG. 3, therefore, the output current of the generator does not at all decrease until the running speed of the engine reaches a predetermined value Nx which corresponds to the emitter voltage, i.e., threshold level of the first transistor $34_1$ of the comparator 30, but starts to decrease when the predetermined running speed Nx is exceeded. Therefore, the generating efficiency of the generator is not decreased when the engine is running at low- to middle-speed ranges.

What is claimed is:

1. An output voltage-adjusting device for vehicle-mounted generators comprising a generator drivably connected to an engine and having an electromagnetic coil, a battery, switching means provided in an electric circuit connecting said coil to said battery and operable to open said circuit upon receipt of an input signal, a signal means operably coupled to the engine for generating electric signals of a frequency corresponding to the running speed of the engine, and an oscillator which converts the output signals of said signal means into pulse signals of a predetermined width having a frequency proportional to the running speed of said engine and which sends the pulse signals as input signals to said switching means.

2. An output voltage-adjusting devices for vehicle-mounted generators according to claim 1, wherein said switching means comprises a first switching transistor inserted in said circuit, a second switching transistor for controlling the base voltage of the first switching transistor to render it conductive or nonconductive, a voltage-dividing resistor connected to said battery, and a Zener diode inserted in a circuit that connects the voltage-dividing registor to the base of said second switching transistor.

3. An output voltage-adjusting device for vehicle-mounted generators according to claim 1, wherein said oscillator comprises a monostable multivibrator.

4. An output voltage-adjusting device for vehicle-mounted generators according to claim 1, further comprising a gate circuit provided in a signal circuit connecting said oscillator to said switching means, and a control device for controlling said gate circuit such that the output signals of said oscillator are cut off until the running speed of the engine reaches a predetermined value.

5. An output voltage-adjusting device for vehicle-mounted generators according to claim 4, wherein said control device comprises a frequency-voltage converter for converting the frequency of the output signals of said oscillator into a voltage, and a comparator operable to send a signal to said gate circuit so as to cut off the output signals of said oscillator fed to said switching device when the output voltage of said converter is lower than said predetermined level.

6. An output voltage-adjusting device for vehicle-mounted generators according to claim 5, wherein said comparator comprises a Schmidt circuit.

* * * * *